United States Patent
Maison (10) Patent No.: US 9,465,774 B2
(45) Date of Patent: Oct. 11, 2016

(54) OPTICAL CHARACTER RECOGNITION SYSTEM USING MULTIPLE IMAGES AND METHOD OF USE

(71) Applicant: Benoit Maison, Wavre (BE)

(72) Inventor: Benoit Maison, Wavre (BE)

(*) Notice: Subject to any disclaimer, the term of this patent is extended or adjusted under 35 U.S.C. 154(b) by 0 days.

(21) Appl. No.: 14/659,935

(22) Filed: Mar. 17, 2015

(65) Prior Publication Data
US 2015/0286888 A1    Oct. 8, 2015

Related U.S. Application Data

(60) Provisional application No. 61/974,117, filed on Apr. 2, 2014.

(51) Int. Cl.
*G06K 9/18* (2006.01)
*G06F 17/21* (2006.01)
*G06K 9/00* (2006.01)
*G06K 9/32* (2006.01)
*G06K 9/62* (2006.01)
*G06K 9/68* (2006.01)

(52) U.S. Cl.
CPC ........... *G06F 17/21* (2013.01); *G06K 9/00671* (2013.01); *G06K 9/3258* (2013.01); *G06K 9/6292* (2013.01); *G06K 9/6807* (2013.01); *G06K 2209/01* (2013.01)

(58) Field of Classification Search
CPC ... G06K 9/18; G06K 9/6201; G06K 9/00442
USPC ........................................................ 382/182
See application file for complete search history.

(56) References Cited

U.S. PATENT DOCUMENTS

| 8,611,661 | B2 | 12/2013 | Nestares |
| 2008/0212901 | A1 | 9/2008 | Castiglia |
| 2013/0155474 | A1* | 6/2013 | Roach ............... G06Q 20/322 358/505 |
| 2013/0315485 | A1* | 11/2013 | Blose ............... G06F 17/2211 382/182 |
| 2014/0141836 | A1 | 5/2014 | Rozumyanskiy |
| 2014/0168478 | A1 | 6/2014 | Baheti |
| 2014/0369556 | A1 | 12/2014 | Zagaynov |

OTHER PUBLICATIONS

Michael Hseuh, Interactive Text Recognition and Translation on a Mobile Device, Electrical Engineering and Computer Sciences, University of California at Berkeley, Technical Report No. UCB/EECS-2011-57, May 13, 2011.
Richard J. Fateman, Interactive OCR: Especially Mathematics, Dec. 13, 1996.

* cited by examiner

*Primary Examiner* — Ruiping Li
(74) *Attorney, Agent, or Firm* — Steinberg Intellectual Property Law LLC; Gloria M. Steinberg, Esq.

(57) ABSTRACT

Disclosed is an improved OCR system wherein the same can be utilized for capturing and analyzing multiple images of a document to increase the efficiency and accuracy of digitizing printed texts on the document. Captured images are merged into a single set of character recognition results via a recognition method from multiple images, which include early fusion, late fusion, and hybrid fusion embodiments. The end product from each of the embodiments provides text and metadata that include recognized words. In late and hybrid fusion, words having confidence scores above a predetermined threshold are assembled together to form paragraphs to reconstruct a digital version of the document. In this way, the present invention utilizes multiple images that can be combined to aggregate information and achieve high accuracy when scanning and digitizing printed texts.

14 Claims, 12 Drawing Sheets

|       | Image 1 |      |       | Image 2 |      | Aggregate Decision | | |
|-------|---------|------|-------|---------|------|-------|---------|------|
| Best  | Word 1  | 0.70 | Best  | Word 1  | 0.50 | Best  | Word 1  | 1.20 |
| Alt 1 | Word 2  | 0.10 | Alt 1 | Word 3  | 0.20 | Alt 1 | Word 3  | 0.25 |
| Alt 2 | Word 3  | 0.05 | Alt 2 | Word 5  | 0.10 | Alt 2 | Word 2  | 0.15 |
| Alt 3 | Word 4  | 0.01 | Alt 3 | Word 2  | 0.05 | Alt 3 | Word 5  | 0.10 |

FIG. 10A

|       | Image 1 |      |       | Image 2 |      | Aggregate Decision | | |
|-------|---------|------|-------|---------|------|-------|---------|------|
| Best  | Word 1  | 0.55 | Best  | Word 3  | 0.60 | Best  | Word 2  | 0.61 |
| Alt 1 | Word 2  | 0.31 | Alt 1 | Word 2  | 0.30 | Alt 1 | Word 3  | 0.60 |
| Alt 2 | Word 3  | 0.05 | Alt 2 | Word 5  | 0.04 | Alt 2 | Word 1  | 0.56 |
| Alt 3 | Word 4  | 0.05 | Alt 3 | Word 1  | 0.01 | Alt 3 | Word 4  | 0.05 |

FIG. 10B

|       | Image 1 |      | Image 2 | | | Aggregate Decision | | |
|-------|---------|------|---|---|---|-------|---------|------|
| Best  | Word 1  | 0.70 |   |   |   | Best  | Word 1  | 0.70 |
| Alt 1 | Word 2  | 0.10 |   |   |   | Alt 1 | Word 2  | 0.10 |
| Alt 2 | Word 3  | 0.05 |   |   |   | Alt 2 | Word 3  | 0.05 |
| Alt 3 | Word 4  | 0.01 |   |   |   | Alt 3 | Word 4  | 0.01 |

FIG. 10C

OPTICAL CHARACTER RECOGNITION SYSTEM USING MULTIPLE IMAGES AND METHOD OF USE

CROSS-REFERENCE TO RELATED APPLICATIONS

This application claims the benefit of U.S. Provisional Patent Application No. 61/974,117, filed Apr. 2, 2014, which is hereby incorporated by reference in its entirety.

FIELD OF THE INVENTION

The present invention generally relates to an optical character recognition (OCR) system and method of use. More particularly, the present invention is directed to character recognition performed on various electronic devices equipped with a camera, wherein the present invention utilizes multiple images interactively captured with the user's guidance to efficiently recognize text having increased accuracy.

BACKGROUND OF THE INVENTION

Optical character recognition is the mechanical or electronic conversion of images of typewritten or printed text into machine-encoded text. It is widely used as a form of data entry from printed paper data records, including invoices, bank statement, mail, and other documents. It is a common method of digitizing printed texts so that it can be electronically edited, searched, stored more compactly, displayed or entered online, and used in machine processes such as machine translation, text-to-speech, key data, and text mining, online forms and mobile applications.

Traditionally, OCR systems rely on optical scanners such as flatbed scanners or document feeders, as well as handheld scanners that are adapted to capture a single high-resolution digital image of a document. These optical scanners typically require the document or a sheet of paper to be secured in a flat configuration. Thereafter, the entire sheet of the paper is illuminated uniformly so that its edges can be identified. The edges of the paper must be parallel with the rows or columns of pixels of a screen space so that the paper appears substantially rectangular in shape and fits a standard paper size. Thus, the captured image on the paper may be rotated until the edges of the paper are parallel with the rows or columns of the pixels. The optical scanners can then detect and recognize lines of text and/or other graphical elements on the captured image. Finally, the texts and/or other graphical elements may be assembled into paragraphs to reconstruct a digital version of the document.

However, if the lines of text and/or other graphical elements cannot be recognized, or if the recognition accuracy is not satisfactory, the entire process is restarted so that the image can be recaptured. Generally, the recognition accuracy is affected by various factors such as a shadow casted on the image or the orientation of the paper, among other factors. Existing OCR systems, therefore, are limited in that they require a single focused and sharp high-resolution image to detect and recognize lines of text and/or other graphical elements on the image. This requires an entire sheet of paper or document to be scanned at one time, wherein the paper must be secured in a flat configuration and illuminated in a uniform manner. Additionally, the paper must be rectangular in shape. If the result is not satisfactory, the entire process must be restarted. Therefore, existing OCR systems are not suitable where the foregoing technical constraints cannot be met; and there is a need for an improved OCR system.

SUMMARY OF THE INVENTION

In view of the disadvantages inherent in the known types of OCR systems now present in the prior art, the present invention provides an improved OCR system wherein the same can be utilized for capturing and analyzing multiple images to increase the efficiency and accuracy of digitizing printed texts.

The present invention is advantageous in that it utilizes multiple images so that they can be combined to achieve a higher accuracy than could be achieved with a single image. Images taken at different times, angles, and locations suffer from different distortions, such as reflections and shadows. For example, some images may be blurry at a first location and sharp at a second location, while other images may be sharp at the first location and blurry at a second location. Thus, multiple distorted images can be merged to construct one image that has a higher resolution, smaller distortions, fewer defects, a substantially flat surface, and more uniform illumination. Aggregating the best sources of information from several images allows for the accurate recognition of documents that would not be possible otherwise. Using multiple overlapping images can also cover a larger scan area than could be captured reliably by one image alone. This is particularly useful when the entire document cannot be captured in one image.

In one embodiment, the present invention is interactive. This allows a user to intervene while capturing an image to make adjustments as necessary. Accordingly, the user can scan a document with a hand-held device that is equipped with a camera, hold the document in front of a device that is equipped with a camera, or hold the document while using the hand-held device. Images of the document are analyzed and any recognized texts and/or characters on the document are presented to the user in real-time. It is contemplated that the recognized texts or characters can be presented visually and/or audibly. As the user is scanning the document, the user can adjust his or her scanning motion, the distance between the camera and the document, and/or the angle between the camera and the document. The adjustments can be made based upon the user's preferences and/or upon a feedback feature that is integral to the hand-held device, wherein said feedback feature is visual, audible, tactile, or any combination thereof In another embodiment, the present invention is non-interactive, which does not involve a user to intervene while capturing an image. In this embodiment, a device that is equipped with a camera may be affixed to an external device that offers mobility. For example, a camera may be affixed to a manned or unmanned vehicle or a robot to capture multiple images of a document.

The present invention further comprises recognition methods from multiple images, wherein the methods comprise early fusion, late fusion, and hybrid fusion. In early fusion, captured images are merged via image fusion. Image fusion comprises two steps: image registration and image merging. Image registration maps one image onto another image, provided that the two images overlap to some extent. Image merging then computes the best estimate of each pixel of the resulting image from the corresponding pixels and neighboring pixels in the two images. Image fusion is followed by single frame document recognizer process, which outputs identified words, numbers, and other characters as text and/or metadata. In contrast, late fusion processes each of the captured images through single frame document recognition to produce a set of text and metadata, wherein the text and metadata are combined to identify words. Hybrid fusion is a combination of early fusion and late fusion. Hybrid fusion combines all of the text and metadata produced from early fusion in order to produce a single set of text and metadata as described in late fusion. It is contemplated that hybrid fusion is the preferred method because it subsumes early and late fusion.

It is therefore an object of the present invention to provide an OCR system that is both user interactive and non-user interactive.

It is another object of the present invention to provide an OCR system that streamlines a method of capturing a high-resolution image of texts and characters on various types, shapes, and/or sizes of documents or medium.

It is still another object of the present invention to provide an OCR system that increases the efficiency of capturing an accurate image having a higher resolution with uniform illumination, less distortions, and fewer defects.

It is still another object of the present invention to provide an OCR system that utilizes early fusion, late fusion, and hybrid fusion.

A final object of the present invention to provide an OCR system that has versatile applications, including document scanning, translation, data capture, tourism and navigation, shopping, aid for visually impaired, and autonomous vehicles and robots.

In the light of the foregoing, these and other objects are accomplished in accordance of the principles of the present invention, wherein the novelty of the present invention will become apparent from the following detailed description and appended claims.

BRIEF DESCRIPTION OF THE DRAWINGS

The above and other objects and advantages of the present invention will be apparent upon consideration of the following detailed description, taken in conjunction with the accompanying exemplary drawings, in which like reference characters refer to like parts throughout, and in which.

DETAILED DESCRIPTION OF THE INVENTION

The present invention is directed towards an OCR system that utilizes multiple images to construct one or more accurate images. For purposes of clarity, and not by way of limitation, illustrative views of the present OCR system are described with references made to the above-identified figures. Various modifications obvious to one skilled in the art are deemed to be within the spirit and scope of the present invention.

Figure 1:
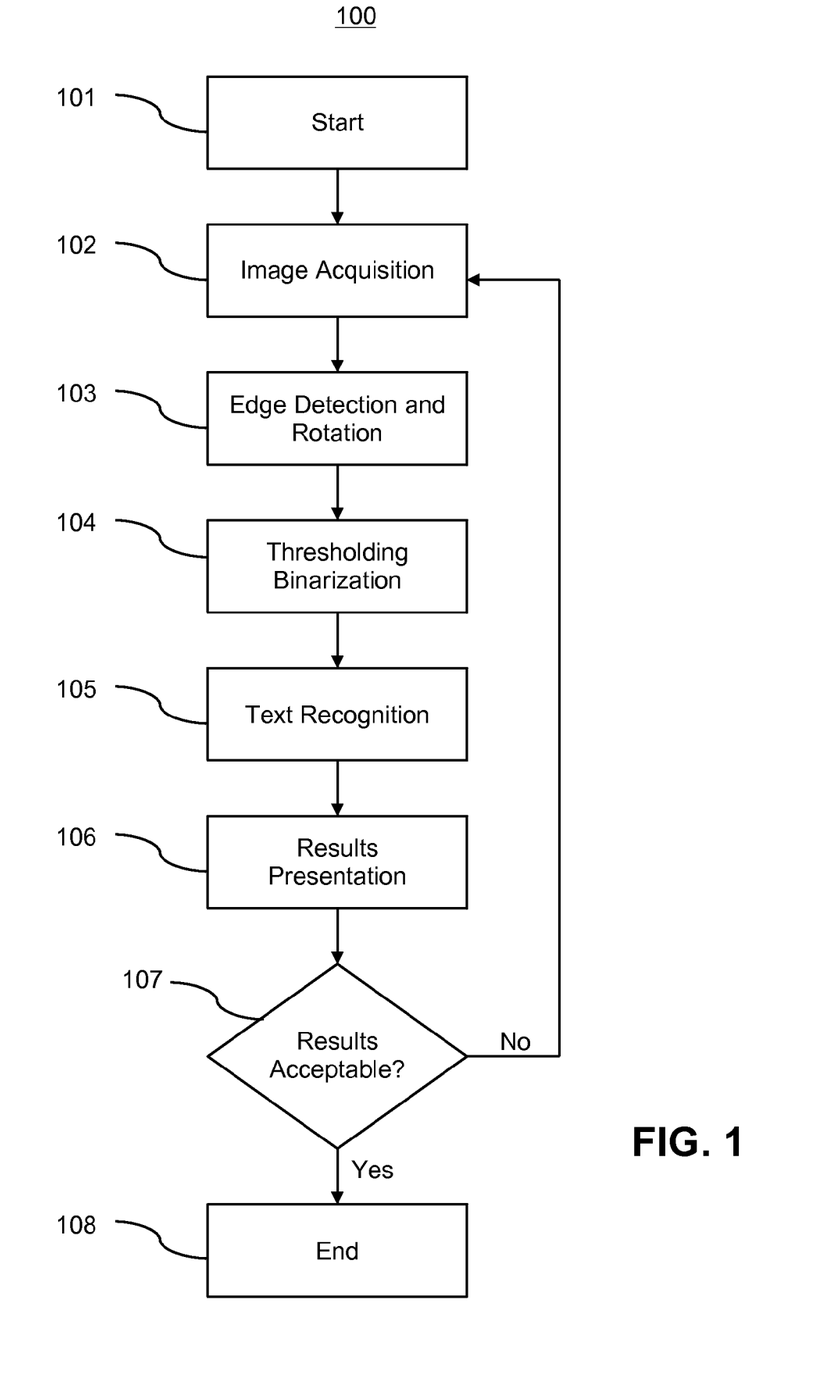
FIG. 1 is diagram of a user feedback loop for traditional scanning

FIG. 1 depicts a diagram of a user feedback loop for traditional scanning 100. To start 101, a user prepares a document for scanning using an optical scanner such as a flatbed scanner, a document feeder, or another device equipped with a camera. Preparing the document for scanning can entail many steps such as locating the corners of the document and releasing the camera shutter. Thereafter, an image on the document is acquired 102. This is accomplished by detecting edges and rotating the document 103 until the edges of the document are substantially parallel with the rows or columns of pixels of a screen space.

Next, document image binarization is performed 104 by converting a gray-scale document image into a binary document image. Binarization allows texts on the image to recognized 105 and presented to the user 106. If the recognized text is acceptable 107, scanning is completed 108. If the recognized text is unacceptable 107, the process is repeated and the image is acquired again 102. Even though the recognition process may consist of many computational steps, none of the steps requires a user's intervention before he or she can determine whether the scanning produced good or acceptable results.

Figure 2:
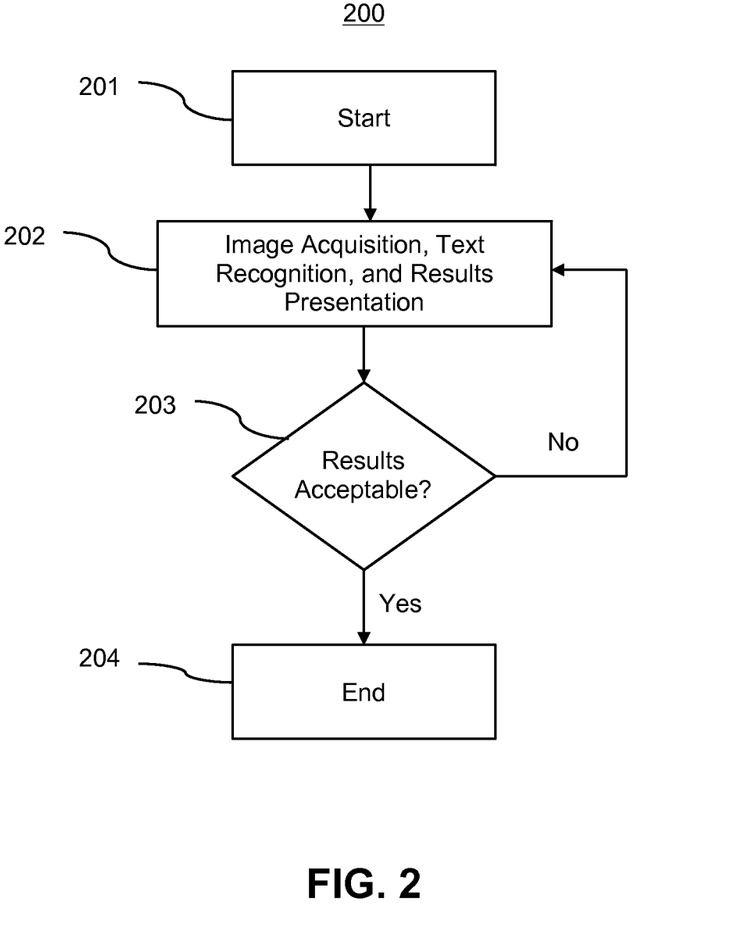
FIG. 2 is a diagram of a user feedback loop for interactive scanning
Figure 3:
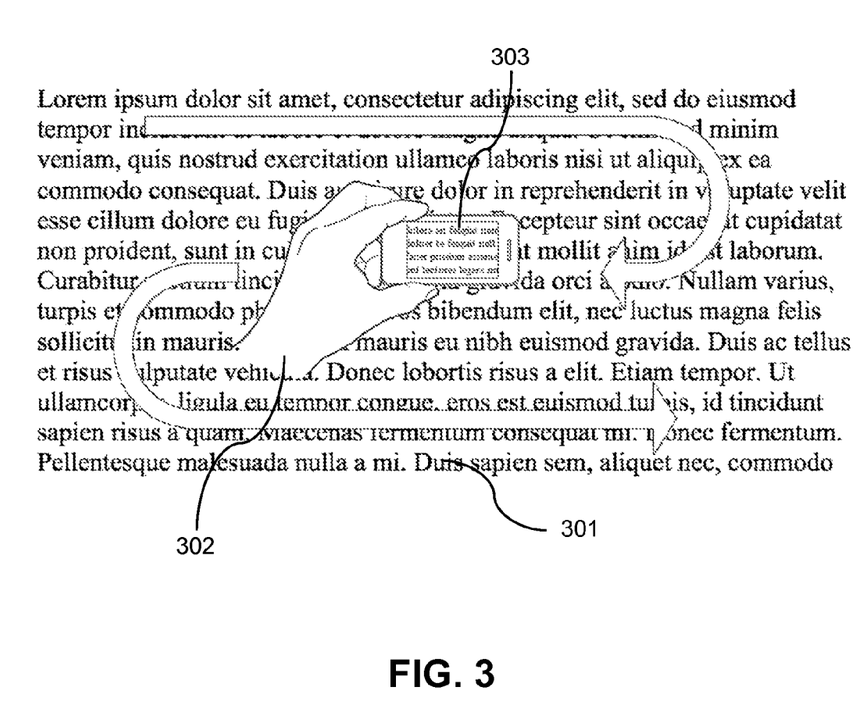
FIG. 3 shows a handheld scanning motion utilized for interactive scanning

Referring now to FIGS. 2 and 3, there is shown a diagram of a user feedback loop for interactive scanning 200 and a handheld scanning motion utilized for interactive scanning, respectively. To start 201, a user prepares a document for scanning by positioning a scanner or a handheld device equipped with a camera in front of a document. Thereafter, an image of the document is acquired, and then any texts on the image is recognized and presented to the user in real-time 202. If the texts are not properly recognized while scanning 203, the user can intervene and repeat the process of acquiring another image 202. If the result is acceptable 203, the user can complete scanning 204. The user feedback loop for interactive scanning 200 is much shorter and faster than user feedback loop for traditional scanning Additionally, interactive scanning leads to more accurate text recognition because the user can reacquire images during the scanning process by adjusting the camera.

Interactive scanning is preferable where a user can readily adjust the camera while scanning, and/or where a user can react to a feedback feature of the present invention by controlling the position of the camera and/or the document, as shown in FIG. 3. The feedback feature may be visual, auditory, or tactile. For example, the feedback feature may be adapted to immediately display messages on the screen on the device, illuminate the screen on the device, or emit beeps through speakers on the camera, depending upon embodiment. The feedback feature enables the user to actively scan by adjusting his or her hand 302 in a scanning motion, the distance between the camera 303 and the text 301, and the angle between the camera 303 and the text 301. The interactive scanning continues until all of the desired text has been acquired, the necessary scanning quality and recognition accuracy is achieved, or an ulterior objective has been fulfilled. Without limitation, the ulterior objectives comprise identifying a product by label and obtaining a useful translation of text on a document.

In another embodiment, the present invention is non-interactive so as to eliminate the need for user intervention. Images may be captured using a device that is equipped with a camera, wherein the device is affixed to a moving vehicle that may be manned or unmanned. For example, the camera may be mounted on a mobile robot. Similar to the interactive embodiment, the non-interactive embodiment is also adapted to capture multiple overlapping images so as to cover a larger scan area and to more accurately recognize texts on a document. In this way, the non-interactive embodiment and the interactive embodiment both increase the efficiency and accuracy of digitizing printed texts.

Figure 4A:
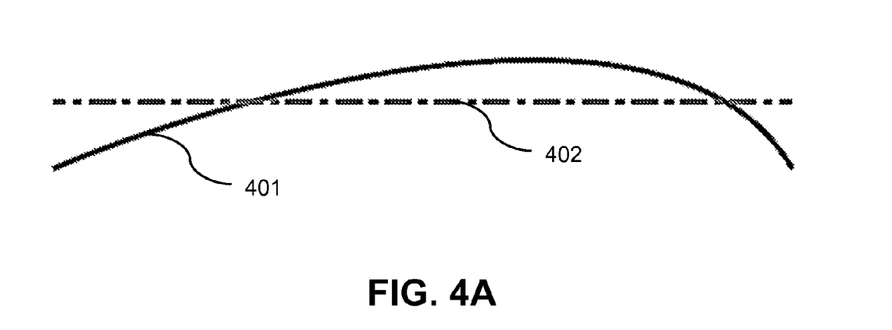
FIG. 4A is an approximation by one linear segment of a curved surface.
Figure 4B:
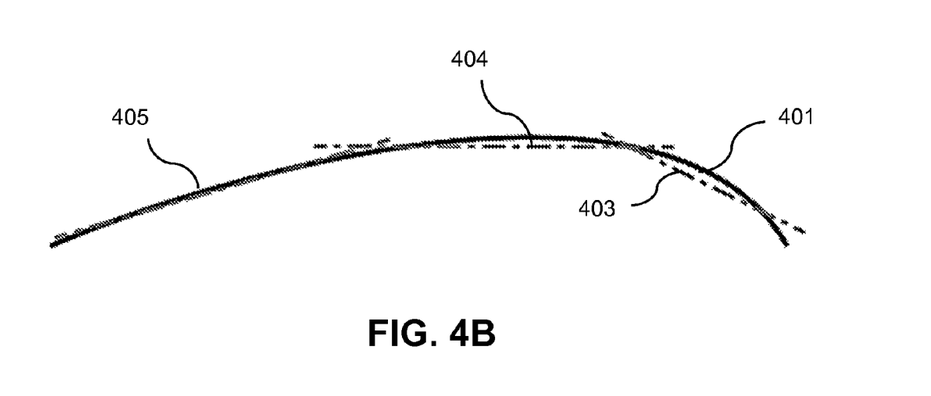
FIG. 4B is an approximation by three linear segments of a curved surface.

Referring now to FIGS. 4A and 4B, there is shown an approximation by one linear segment of a curved surface and an approximation by three linear segments of a curved surface, respectively. Traditional scanning methods limit a user to capturing one linear segment 402 of a curved surface 401. In this way, the captured image of a document is distorted and subsequently, any texts on the distorted image cannot be recognized in an accurate manner. This can be especially problematic when a user is attempting to recognize texts on a curved object such as a can label via a traditional OCR system.

The present invention overcomes this problem by providing interactive scanning, which allows the user to adjust his or her scanning motion, thereby capturing a number of segments of a curved surface. For instance, the user can capture a first 403, a second 404, and a third 405 linear segment of a curved surface 401, wherein the first 403, the second 404, and the third 405 linear segments can slightly overlap and can be merged to form a whole image that is substantially flat and that comprises minimal distortion.

Merging several overlapping recognition results can also be advantageous when the text area is too large or oddly shaped to be captured by one image. In this regard, the document can be reconstructed piece by piece, with each new image bringing new information about the document. Additionally, it is contemplated that the conditions that increase the accuracy of text recognition is better satisfied in smaller areas. More specifically, capturing smaller areas of a scanned document result in higher resolution, as the number of pixels making up each of the letters in text is larger.

Figure 5A:
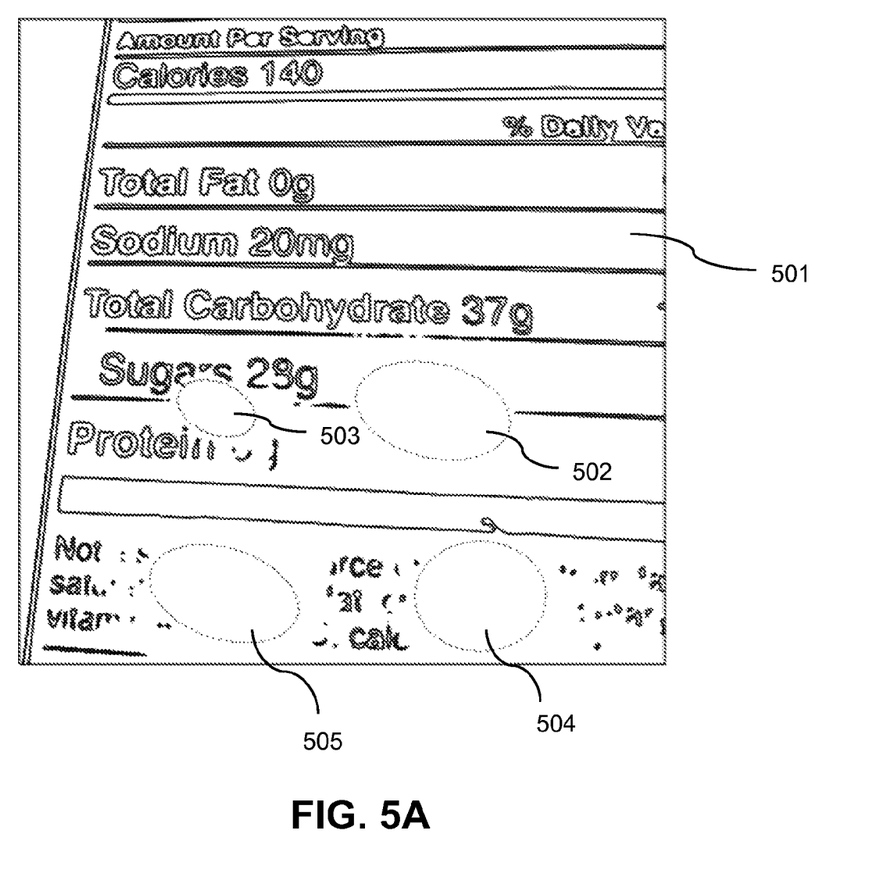
FIG. 5A shows an exemplary view of a scanned document from a first angle.
Figure 5B:
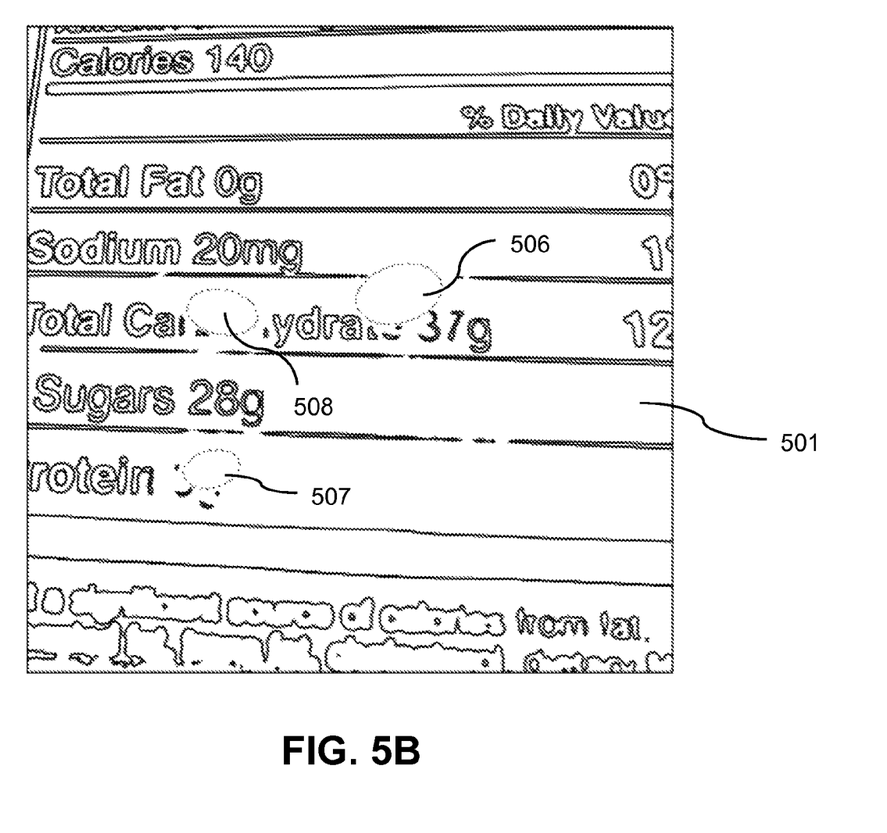
FIG. 5B shows an exemplary view of a scanned document from a second angle.

Because the present invention explicitly deals with capturing partial images of a scanned document, it is well suited to recognizing texts that is not printed on a rectangular paper of a standard size. For example, the present invention can be used to scan images on objects of various shapes, such as cans, bottles, and posters, among others. FIGS. 5A and 5B depict exemplary views of a scanned food nutrition label 501 from a first angle and a second angle, respectively. From the first angle, reflections 502, 503, 504, and 505 are shown near the bottom of the label 501. In contrast, reflections 506, 507, and 508 are shown near the middle of the label 501 from the second angle.

By combining the images from the first angle and the second angle, wherein the two images partly overlap, the present invention is able to achieve higher recognition accuracy than that can be achieved using traditional methods. This is in part due to the images being taken at different times and from slightly different angles, which result in the two images having different distortions. Specifically, reflections and shadows, as well as focus and blur are at different locations in the two images and hence texts and/or characters on each image. The camera noise in low light conditions also varies from one image from another. Aggregating the best sources of information from the two images allows for the accurate recognition of texts that would not be possible otherwise. For example, the words "TOTAL CARBOHYDRATE" are recognizable in FIG. 5A, but not in FIG. 5B.

Figure 6A:
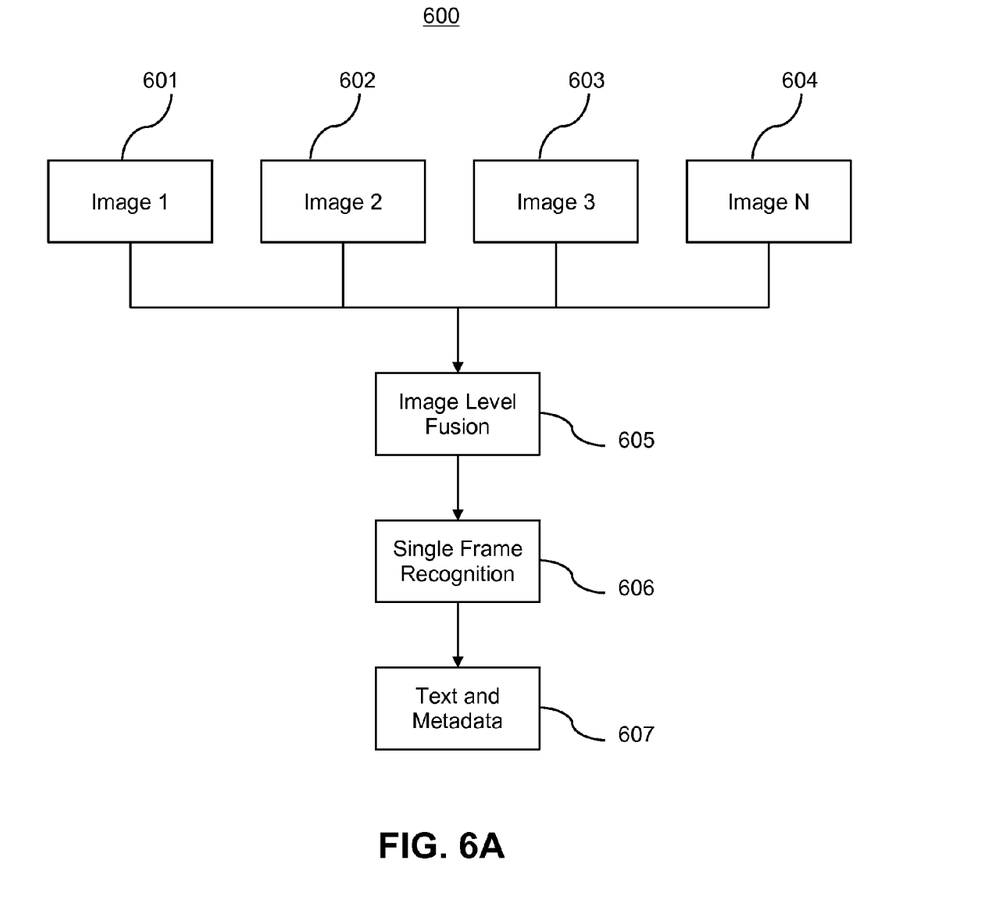
FIG. 6A shows an exemplary early fusion flow chart.

The present recognition method from multiple images comprises three embodiments: early fusion; late fusion; and hybrid fusion. An exemplary early fusion flow chart is shown in FIG. 6A. In early fusion, the source images 601, 602, 603, 604 are merged into one image that is the best image representation of a scanned document. The merging process is known as image fusion. Image fusion comprises two steps: image registration; and image merging. Image registration comprises the steps of finding a geometric transformation that maps one source image onto another source image, provided that the images comprise some overlap. The geometric transformation comprises a translation, a rotation, and a perspective transformation. The geometric transformation is determined by approximating matching areas in two or more images. It is contemplated that a block matching method or a similar method can be used to approximate matching areas. Once matching areas in two or more images are approximated, a least-squares algorithm can be applied to verify that the matching areas correspond to one another.

Image merging comprises the steps of computing the best estimate of each pixel value of the merged image from the corresponding and neighboring pixels in the individual source images. The reference coordinate system of the merged image may be substantially equal to the reference coordinate system of at least one of the source images. The present invention computes the pixel value by utilizing a patching method or an averaging method. The patching method comprises the steps of detecting various defects such as shadows, reflections, and/or blurs on one or more source images. Thereafter, areas in the reference coordinate system that contain the defects are determined by computing Voronoi cells with the defect locations as centroids. Finally, portions of the captured images having little or no defects are patched together to construct a whole image. Because the patching method substantially eliminates defects, it may be preferable if some or most of the images comprise defects such as shadows and reflections.

The averaging method comprises the steps of determining the mean, median, or mode of the pixel values of the source images. In some embodiments, neighboring pixel values may be interpolated in order to achieve fractional pixel coordinates. In non-overlapping areas, the pixel value is simply copied from the only image where it is visible in the merged image. Either the patching method or the averaging method may be used depending on the quality of the captured images and the application of the merged image.

The images may be merged 605 using image combination methods known in the art. Namely, the images may be merged using image stitching, which is the process of combining multiple images with overlapping fields of view to produce a segmented panorama or high-resolution image. The images may also be merged using super resolution, which is the process that superimposes and interpolates several images of the same scene to produce a resulting image of higher resolution than the source images.

Figure 6B:
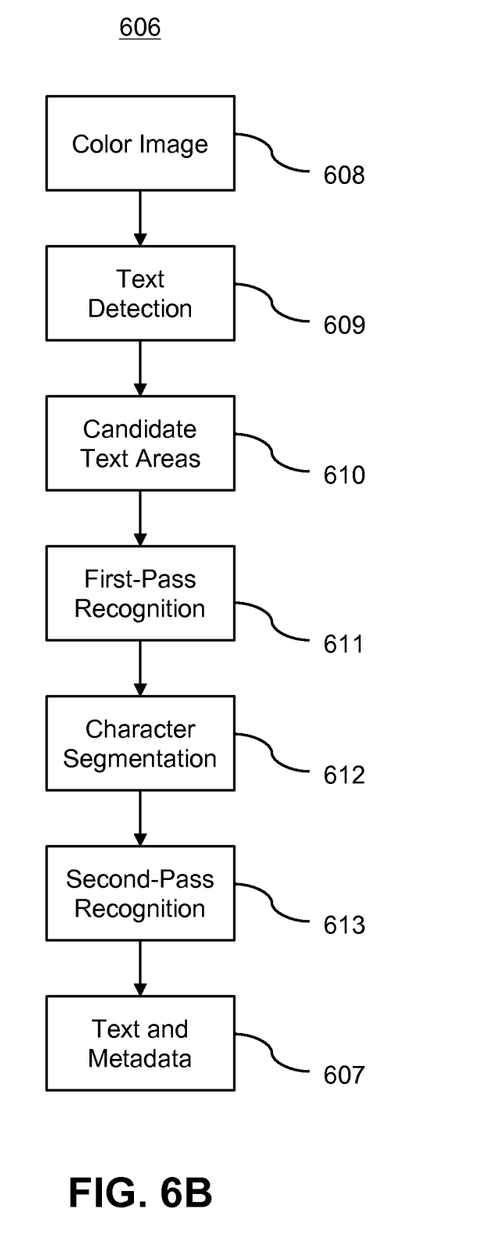
FIG. 6B shows a single frame document recognition flow chart.

After the images are fused, the resulting image is processed through single frame document recognition 606, which outputs digitized text and metadata 607 that comprises identified words, numbers, and other characters. The single frame document recognition 606 is a method of recognizing texts, symbols, pictograms, and other characters from a single image. The single frame document recognition 606 comprises three primary steps: text detection; first pass text recognition; and second pass text recognition, which are shown in FIG. 6B. To start, the single frame document recognition requires an input of one color image 608, wherein the color image may comprise YUV or LAB color space and some texts.

After a color image is input 608, text detection 609 attempts to locate regions of the resulting image having texts, symbols, pictograms, and other characters. The objective of this step is to eliminate as much non-text regions or areas of the image as possible, but not reject any regions that contain texts. This is best achieved by aggregate methods utilizing orientation histograms, color histograms, or a combination of both. For orientation histograms, the merged image is divided into rectangular tiles. The orientation of the image gradient is computed for each pixel in each tile. Thereafter, a histogram of orientations angles is constructed. For color histograms, the pixel colors in the YUV or LAB color space are quantized for each pixel in each tile. Thereafter, a three-dimensional histogram of colors is constructed.

Text detection compares the orientation histogram and/or the color histogram in each tile to typical text histograms and computes a text similarity score for each tile. Typical text histograms can be obtained from training images that have been annotated to indicate text regions. Typical text histograms can also be manually constructed to reflect known text characteristics. For example, a typical text color histogram generally comprises few high-count bins that correspond to the background and text colors. In contrast, orientation histograms comprise many or all bins with large counts and are more uniform in text areas than in non-text areas.

Text is detected wherever more than N number of neighboring tiles has a text similarity score above a predetermined threshold value T. Without limitation, factors such as the size of the tiles, the number of neighboring tiles, and the threshold value depend upon the size of the merged image, expected size of the text, and the exact nature of the text similarity score. The foregoing factors, including the predetermined threshold value T may be adjusted in order to minimize the failure of detecting text and/or to minimize the probability of false rejection.

Candidate text areas 610 are defined by a set of contiguous tiles. The orientation of the text is initially estimated for each candidate text area. Thereafter, the position of the text baselines, x-height, cap-height, and descender are determined. Finally, a fast text recognition method, such as Viterbi decoding of Hidden Markov Model (HMM) is applied to each candidate text area to provide first pass text recognition results 611 for each candidate text areas. In HMM, the model states are vertical slices of letters and the features are vertical stripes of pixels and gradient orientations, wherein the features are vertical relative to the baseline.

The first pass text recognition results 611 comprise primary results and alternate results. Each of the primary results and alternate results comprises a precise location and bounding box for each recognized character, symbol, or pictogram. The bounding box of each candidate text area is divided into non-overlapping tiles. For each tile, a histogram of gradients is computed. The histograms of all the tiles within the bounding box are concatenated to form a feature vector. Standard classification techniques, such as Support Vector Machines are applied to the feature vector to yield a character identification and font family information. The number of tiles and the size of the histograms depend on the image resolution and the expected size of the characters in pixels. The classifier is trained on known data, such as images of text that have been manually annotated with character identities and bounding boxes, or generated from known text.

Additionally, the primary and alternate results first pass text recognition results 611 comprise new estimates of the text baselines, x-height, cap-height, descender positions, and text similarity scores. It is contemplated that a high text similarity score means that the fast text recognition method has found a good match, and the candidate text area likely comprises texts. Accordingly, a low text similarity score means that the fast text recognition method did not find a good match, and the candidate text area is unlikely to comprise texts. If a candidate text area comprises a text similarity score that falls below a predetermined threshold, the candidate text area is discarded.

The foregoing information disclosed in the first pass text recognition results 611 is collectively referred to as character segmentation 612. Character segmentation 612 allows for more detailed and accurate character recognition in the second pass text recognition 613. The second pass text recognition 613 utilizes both primary and alternate results of the first pass text recognition 611. In this way, the alternate results of the first pass text recognition 611 can be utilized to recognize text that is otherwise not recognizable using only primary results.

The output of the recognized characters derived from primary and alternate results is further processed to form words or numbers by stringing or grouping characters in the direction of their baseline. Optionally, strings of characters are looked up in a list of words or a dictionary to make sure that only valid words are output. The final output of the text and metadata 607 from the second pass text recognition 613 comprises a hierarchical set of words, numbers, letters, digits, and pictogram identities. For each hierarchical set, the location and shape of the bounding box, the text similarity score, and other information are provided.

Figure 7:
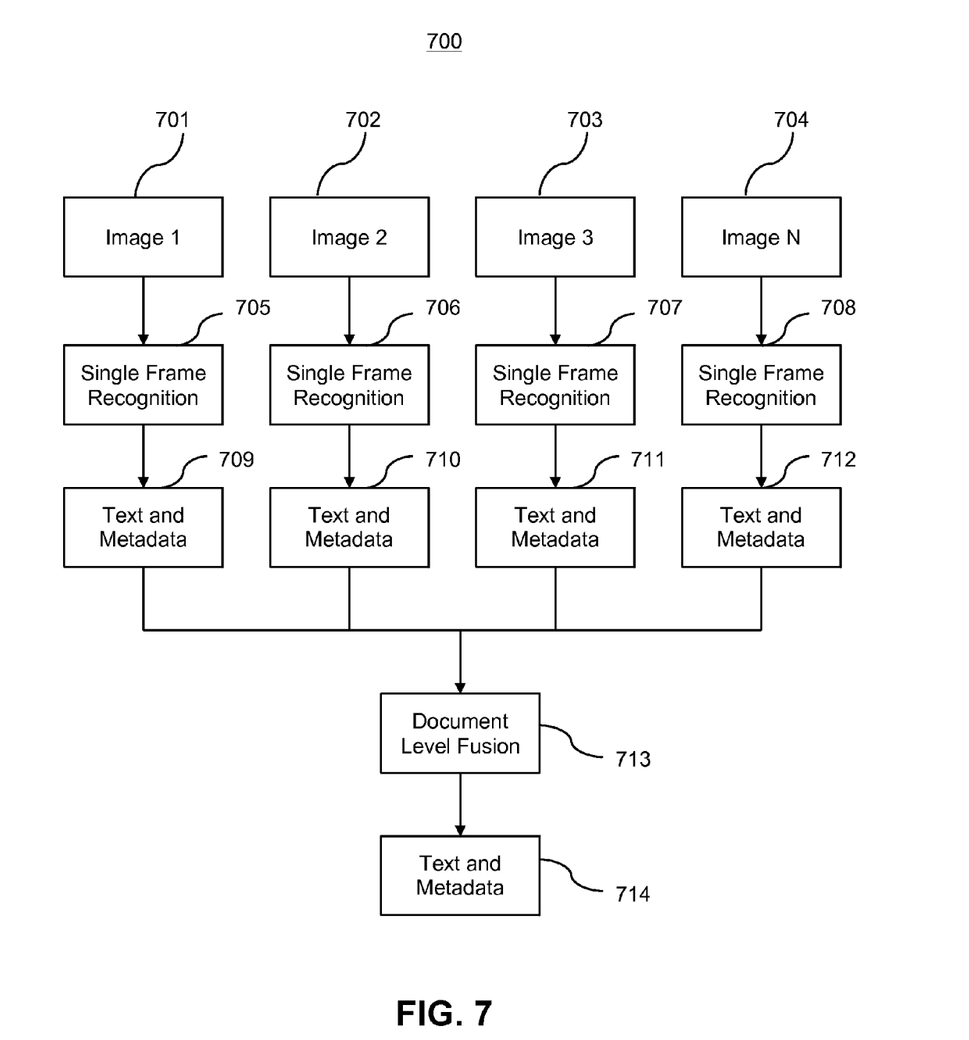
FIG. 7 shows an exemplary late fusion flow chart.

Referring now to FIG. 7, there is shown an exemplary late fusion flow chart 700. Late fusion applies single frame document recognition 705, 706, 707, 708 to each image 701, 702, 703, 704 as described previously. The resulting text and metadata 709, 710, 711, 712 of each single frame document recognition 705, 706, 707, 708 consists of letters, words, symbols, logos, pictograms, and other characters. Additionally, the resulting text and metadata 709, 710, 711, 712 include information such as the exact location of the image of each letter or character that is recognized, the font type that is recognized, the size and color of the character, the confidence level that the recognizer assigns to each character, and alternate results, among other factors.

Thereafter, the resulting text and metadata 709, 710, 711, 712 are merged in a document level fusion 713 to output a single set of text and metadata 714. Because the resulting text and metadata 709, 710, 711, 712 include various information relating to the text and other characters, late fusion puts the resulting text and metadata from different images in correspondence; merges the results from different images in a more accurate and complete version; and removes extraneous results that have been introduced by the merging.

Figure 8:
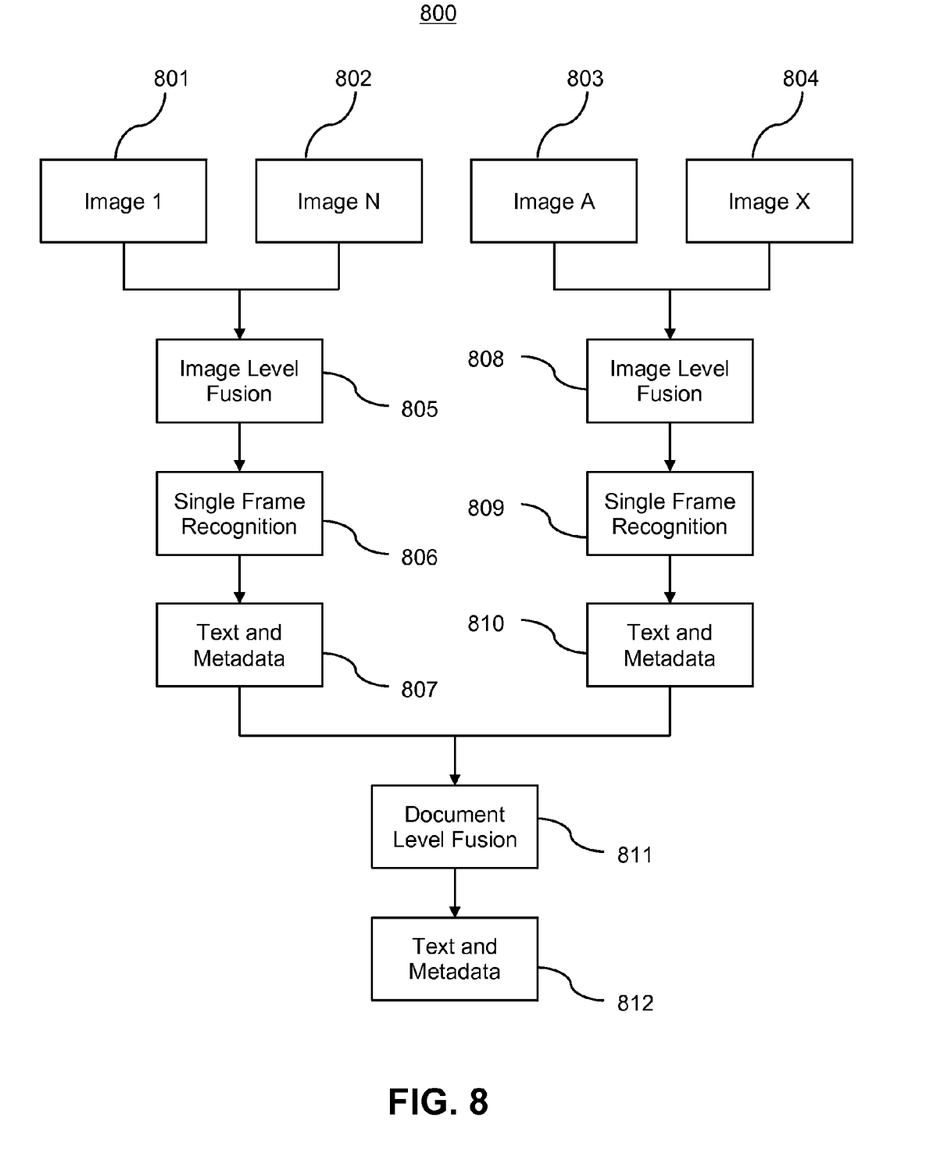
FIG. 8 shows an exemplary hybrid fusion flow chart.

FIG. 8 depicts an exemplary hybrid fusion flow chart 800. Hybrid fusion is a combination of early fusion and late fusion. In this way, hybrid fusion is the preferred embodiment of image fusion. In hybrid fusion, groups of images that have been captured at similar times are merged using image combination methods such as image stitching or super resolution, similarly to early fusion. In the illustrated embodiment, a first image 801 and a second image 802 are merged to create a first merged image 805. Similarly, a third image 803 and a fourth image 804 are merged to create a second merged image 808. Each of the resulting images 805, 808 is then processed with single frame document recognition 806, 809. Finally, the resulting text and metadata 807, 810 are merged similarly in a document level fusion 811 to output a single set of text and metadata 812, similar to late fusion. Without limitation, the number of successive images to merge is based on the camera frame rate, the type of application, and other factors. Alternatively, the number of successive images to merge can be dynamically adjusted to increase or decrease the image quality and to accommodate to the speed of the scanning movement in either interactive or non-interactive embodiment.

Figure 9:
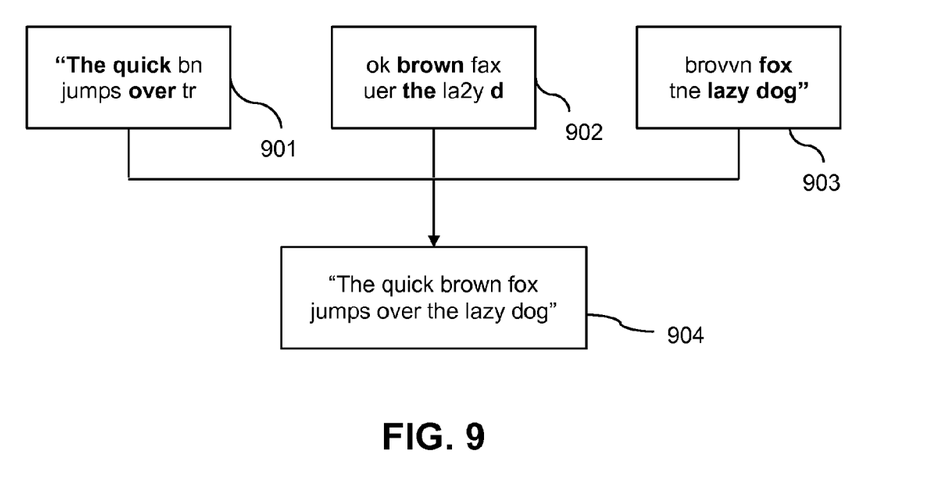
FIG. 9 shows an exemplary embodiment of merging results using late fusion or hybrid fusion.

FIG. 9 depicts an exemplary embodiment of merging results of the present invention using late or hybrid fusion. The illustrated embodiment comprises a first set 901, a second set 902, and a third set 903 of overlapping body of text. Each of the sets 901, 902, 903 includes words having high confidence scores and low confidence scores. Words having high confidence scores comprise recognizable texts that are more likely to be accurate. Conversely, words having low confidence scores comprise unrecognizable texts or errors. When the sets 901, 902, 903 are merged, only the words having high confidence scores are assembled into a paragraph 904 to reconstruct a digital version of the scanned document.

Figure 10A:
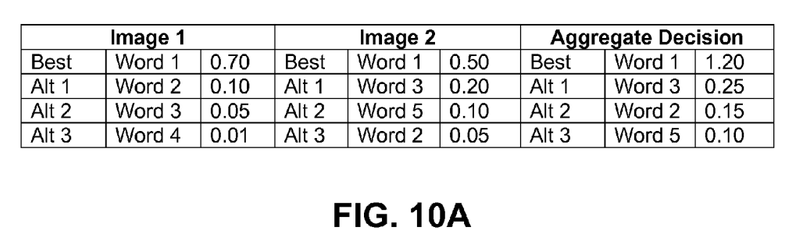
FIG. 10A shows an example of merging several overlapping recognition results using an agreement method.
Figure 10B:
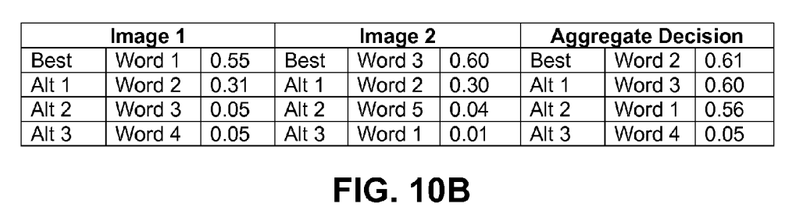
FIG. 10B shows an example of merging several overlapping recognition results using a substitution method.
Figure 10C:
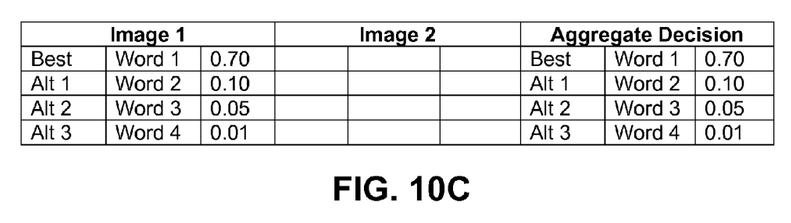
FIG. 10C shows an example of merging several overlapping recognition results using an insertion method.

FIGS. 10A, 10B, and 10C show examples of merging several overlapping recognition results using confidence scores. The recognized words, their relative location, and other characteristics such as size and font are used to find correspondences between two sets of results. For instance, the present invention can determine locations of a first word and a second word by comparing the surrounding characters or textual elements in multiple images having the first word and the second word therein.

If the first word is not properly recognized in one of the images, but it is captured in other images, the first word can still be recognized using the other images. In another example, if the word that is recognized instead of the second word in a second image is the same word that is the second alternate of the second word in a first image, then the second word is the second alternative of the second word in the first image. In any case, the alternate results help match results that contain errors. Not all results of the first image need to be matched with the results of the second image to establish a correspondence. It is contemplated that approximately three matches will suffice to estimate a translation, in-plane rotation, and scaling between the two images. Approximately four matches will allow the estimation of a perspective transform. More matches will enable a more robust estimate via over-complete methods such as least squares minimization or similar algorithm. The result of the correspondence step is the parameter of a geometric transformation such as translation vectors and rotation angles that maps the pixel coordinates of one image into the pixel coordinates of the another image.

Where two sets of results differ, the merging step exploits the results correspondence to correct errors and fill in the gaps. The process is incremental, adding recognition results from one image at a time. The matching process is repeated between the aggregate document and all the other images. The addition of each new image corrects more errors and expands the coverage of the aggregate document. In one embodiment, Location A in Image 1 corresponds to location A' in Image 2 if the geometric transformation maps the coordinates of A in Image 1 onto the coordinates of A' in Image 2 within a small error. More precisely, when the coordinates of A and A' are substantially equal or when the pixel distance between A and A' is less than the size of the smallest bounding box of the words that are recognized at A and A', the bounding boxes of the words significantly overlap and Images 1 and 2 can be merged.

Several situations can arise for each word in the recognition results of Images 1 and 2. FIG. 10A shows merging several overlapping recognition results using an agreement method. Under the agreement method, the confidence score of a word in the aggregate document is the sum of the confidence score of primary and alternate results. For example, if a word is recognized at location A in Image 1, and the same word is recognized at the corresponding location A' in Image 2, the word is copied to the aggregate document at location A. The alternate results of the word in Images 1 and 2 are merged and copied to the aggregate document as the alternates of the word. The confidence score of the word and of its alternates is the sum of the confidence scores in Images 1 and 2.

FIG. 10B shows merging several overlapping recognition results using a substitute method. If a first word is recognized at location A in Image 1, and a second word is recognized at the corresponding location A' in Image 2, the first word, the second word, and their lists of alternate results of in Images 1 and 2 are merged, de-duplicated and copied to the aggregate document at location A. When a word is present in both alternate lists, its confidence scores are added. The aggregate main result at location is the word with the largest confidence score.

FIG. 10C shows merging several overlapping recognition results using an insertion method. If a word is recognized at location A in Image 1, and there is no recognized word near corresponding location A' in Image 2, the word and its alternates are copied at the same location A in the aggregate set of results with the same confidence scores. Similarly, if a word is recognized in Image 2 at location A', and there is no recognized word near corresponding location A in image 1, the merging decision is treated in a similar manner.

In another embodiment, several overlapping recognition results can be merged using an expansion method. If a word is recognized at location A in Image 1, and corresponding location A' in Image 2 falls outside the image bounds, the word and its alternates are copied at the same location A in the aggregate set of results with the same confidence scores. Similarly, if a word is recognized at location A' in Image 2 and corresponding location A in Image 1 falls outside the image bounds, the merging decision is treated in a similar manner.

To display the best result after all images have been incorporated or after all given images have been incorporated, a pruning step must be performed. If the fusion process continues with more images, it continues with the non-pruned aggregate document. Pruning is desired when the aggregate document contains too many words or words having low confidence scores. Additionally, the aggregate document may contain repeated words if the correspondence step fails to map the locations of the words accurately.

First, all the confidence scores of the words and alternate words are divided by the number of images results that have been merged into the aggregate document. The pruning steps then removes: all the words that have a confidence score below a given threshold; and all the words that significantly overlap another word via bounding boxes but have a lower confidence score.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An optical text recognition method, comprising the steps of:
    acquiring, with a camera, at least one set of multiple images of a document having texts thereon by adjusting scanning motion based on real-time feedback images of captured images, wherein said at least one set of multiple images comprise said captured images;
    determining whether two or more of said at least one set of multiple images of said document overlap, wherein each of said at least one set of multiple images comprise different parts of said document;
    combining said at least one set of multiple images via image fusion to form at least one merged image;
    processing each of said at least one merged image through single frame document recognition to produce at least one set of text and metadata of said at least one merged image.

2. The optical text recognition method of claim 1, wherein said set of text and metadata comprises identified words.

3. The optical text recognition method of claim 1, wherein said image fusion comprises the steps of image registration and image merging.

4. The optical text recognition method of claim 3, wherein said image registration comprises the steps of:
    finding a geometric transformation that maps a first image onto a second image, wherein said first image and said second image overlap;
    approximating matching areas in said first image and said second image;
    verifying that the matching areas correspond to one another.

5. The optical text recognition method of claim 3, wherein said image merging comprises the steps of:
    computing a best estimate of each pixel value of said merged image from corresponding and neighboring pixels in said at least one image.

6. The optical text recognition method of claim 1, wherein said single frame document recognition comprises the steps of:
    inputting a color image;
    detecting at least one text area on said color image;
    processing said at least one text area through a first pass text recognition;
    determining character segmentation;
    processing said character segmentation through a second pass text recognition to produce said set of text and metadata.

7. The optical test recognition method of claim 1, further comprising the steps of:
    combining said at least one text and metadata via document level fusion to produce a merged set of text and metadata, wherein said merged set of text and metadata comprises identified words, each of said identified words having a confidence score.

8. The optical text recognition method of claim 7, further comprising the steps of:
    determining whether said confidence score of said identified words is less than or greater than a threshold value;
    discarding said identified words if said confidence score of said identified words is less than said threshold value;
    assembling said identified words into paragraphs if said confidence score of said identified words is greater than said threshold value.

9. The optical text recognition method of claim 1, wherein acquiring said at least one set of multiple images of said document comprises the steps of:
    evaluating and making adjustments to said at least one set of multiple images.

10. An optical text recognition method, comprising the steps of:
    acquiring, with a camera, at least one image of a document having texts thereon by adjusting scanning motion based on real-time feedback of captured images, wherein said at least one image comprise said captured images and further wherein each of said at least one image comprises different parts of said document;
    processing each of said at least one image through single frame document recognition to produce a set of text and metadata for each of said at least one image;
    combining said set of text and metadata for each of said at least one image via document level fusion to produce a merged set of text and metadata, wherein said merged set of text and metadata comprises identified words, each of said identified words having a confidence score.

11. The optical text recognition method of claim 10, further comprising the steps of:
    determining whether said confidence score of said identified words is less than or greater than a threshold value;
    discarding said identified words if said confidence score of said identified words is less than said threshold value;
    assembling said identified words into paragraphs if said confidence score of said identified words is greater than said threshold value.

12. The optical text recognition method of claim 10, wherein said single frame document recognition comprises the steps of:
    inputting a color image;
    detecting at least one text area on said color image;
    processing said at least one text area through a first pass text recognition;
    determining character segmentation;
    processing said character segmentation through a second pass text recognition to produce said set of text and metadata.

13. The optical text recognition method of claim 10, wherein acquiring said at least one image of said document comprises the steps of:
    evaluating and making adjustments to said at least one image.

14. The optical test recognition method of claim 7, wherein said at least one set of multiple images comprises a first set of multiple images and a second set of multiple images; said first set of multiple images forming a first merged imaged and said second set of multiple images forming a second merged image;

each of said first merged image and said second merged image producing said at least one set of text and metadata;

said at least one set of text and metadata of said first merged image and said at least one set of text and metadata of said second merged image combined to produce a single set of text and metadata.

\* \* \* \* \*